(12) United States Patent
Winkelmann et al.

(10) Patent No.: US 10,676,174 B2
(45) Date of Patent: Jun. 9, 2020

(54) FOLDABLE WING AND ACTUATOR ARRANGEMENT

(71) Applicant: Airbus Operations GmbH, Hamburg (DE)

(72) Inventors: Christoph Winkelmann, Hamburg (DE); Johannes Rupp, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 420 days.

(21) Appl. No.: 15/619,031

(22) Filed: Jun. 9, 2017

(65) Prior Publication Data
US 2017/0355441 A1 Dec. 14, 2017

(30) Foreign Application Priority Data

Jun. 9, 2016 (EP) ..................................... 16173835

(51) Int. Cl.
*B64C 3/56* (2006.01)
*F15B 9/10* (2006.01)

(52) U.S. Cl.
CPC .................. *B64C 3/56* (2013.01); *F15B 9/10* (2013.01); *B64C 2201/102* (2013.01); *Y02T 50/14* (2013.01)

(58) Field of Classification Search
CPC .. B64C 3/56; B64C 3/546; B64C 3/38; B64C 9/08; B64C 9/323; B64C 2201/102; B64C 11/28; B64C 27/50; B64C 23/072; F15B 9/10
See application file for complete search history.

(56) References Cited

U.S. PATENT DOCUMENTS

| | | | |
|---|---|---|---|
| 2,508,647 A | 5/1950 | Newman et al. | |
| 2,736,515 A | 2/1956 | Dolan et al. | |
| 5,452,643 A | 9/1995 | Smith et al. | |
| 2011/0290353 A1* | 12/2011 | Fukui | F04B 49/06 137/565.11 |

(Continued)

FOREIGN PATENT DOCUMENTS

EP     2 676 878     12/2013

OTHER PUBLICATIONS

Search Report for EP16173835.6 dated Dec. 5, 2016, 8 pages.

*Primary Examiner* — Philip J Bonzell
*Assistant Examiner* — Tye William Abell
(74) *Attorney, Agent, or Firm* — Nixon & Vanderhye P.C.

(57) ABSTRACT

A wing (9) having a base section (11) and a tip section (13) pivotably connected to the base section (11) such that the tip section (13) is pivotable between a deployed position and a stowed position in which the spanwise length of the wing (9) is smaller than in the deployed position. The wing arrangement also has an actuating arrangement (19) including a linear hydraulic actuator (21) coupled between the base section (11) and the tip section (13) such that it is operable to selectively move the tip section (13) between the deployed position and the stowed position, a first and a second hydraulic connection portion (79a, 79b) connected to the linear hydraulic actuator (21) such that they are in fluid communication with different chamber sections (27a, 27b) of a cylinder (25) of the linear hydraulic actuator (21), and a first hydraulic subsystem (81a) and a second hydraulic subsystem (81b).

15 Claims, 7 Drawing Sheets

(56) References Cited

U.S. PATENT DOCUMENTS

2013/0327883 A1* 12/2013 Kordel .................... B64C 3/56
                                                              244/49
2013/0341467 A1* 12/2013 Sakurai ................... B64C 3/56
                                                             244/201
2016/0096617 A1*  4/2016 Ito .......................... B64C 9/323
                                                              92/51

* cited by examiner

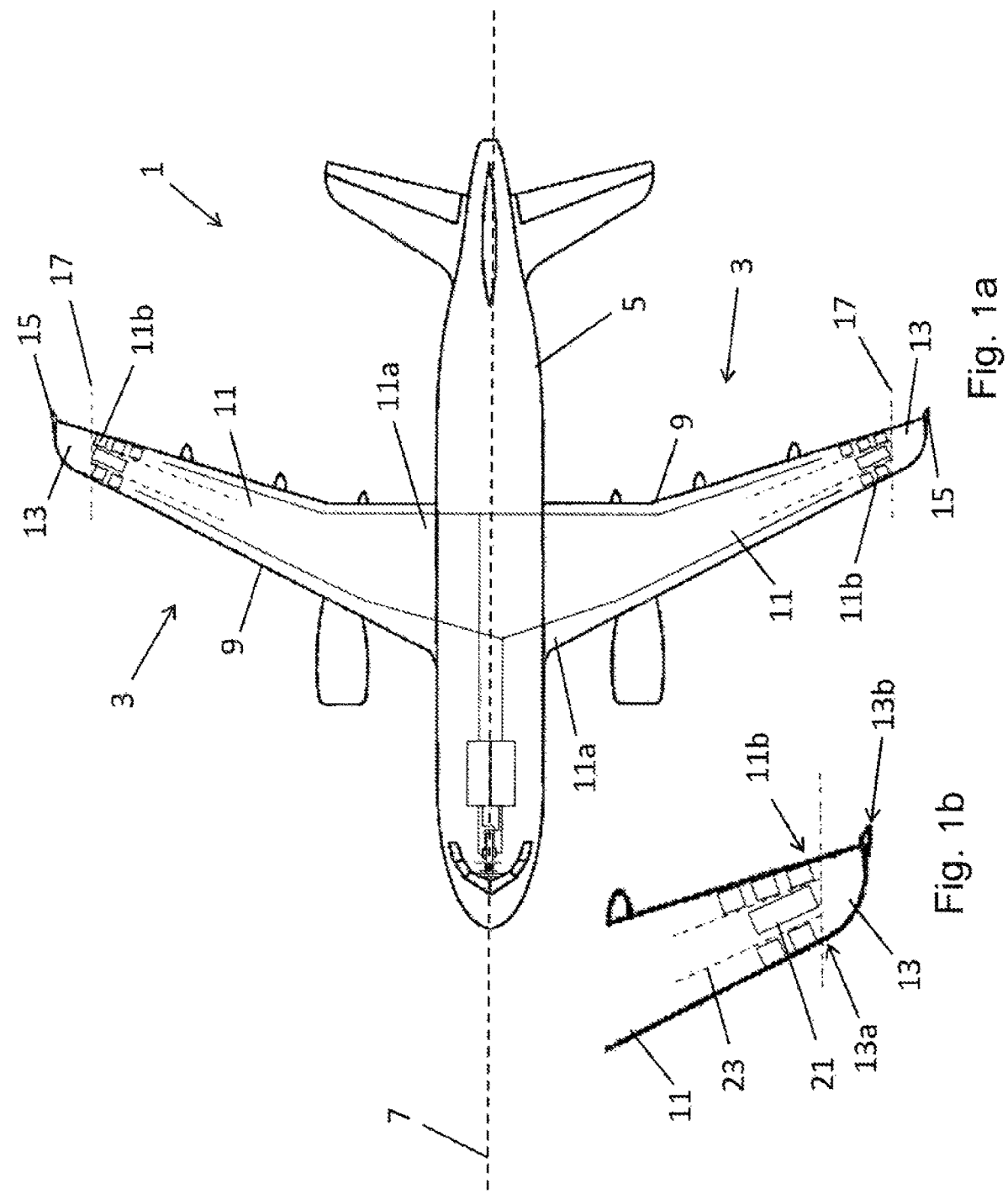

FOLDABLE WING AND ACTUATOR ARRANGEMENT

RELATED APPLICATION

This application claims priority to and incorporates by reference European Patent Application 16173835.6 filed Jun. 9, 2016.

BACKGROUND AND SUMMARY OF INVENTION

The present invention relates a wing arrangement for an aircraft comprising a wing having a base section having a first end portion and an opposite second end portion, wherein the first end portion is adapted to be secured to the fuselage of an aircraft, and a tip section having a third end portion and an opposite fourth end portion, wherein the third end portion is pivotably connected to the second end portion such that the tip section is pivotable about a pivot axis between a deployed position and a stowed position in which the spanwise length of the wing is smaller than in the deployed position.

The aspect ratio, i.e. the ratio of span to chord, of an aircraft wing is one factor influencing the efficiency of the aircraft during flight. Generally, an increase of the aspect ratio is associated with an increased efficiency during steady flight. Therefore, an increase of the wingspan of an aircraft is one factor to take into consideration when seeking to reduce fuel consumption. However, when elongating the wing of an existing family of aircraft, it may become necessary to adapt the aircraft family specific infrastructure, and airport fees may increase.

One possibility to increase the wingspan without having to adapt the aircraft family specific infrastructure and having to deal with increased airport fees, or to reduce airport fees for existing aircraft is to provide for a foldable wing construction which allows to pivotably move an outboard end portion of the wing between a deployed position, in which the wing has its normal flight configuration, and a stowed position, in which the wing has a folded configuration and the wingspan is decreased as compared to the deployed position.

The present invention may be configured to provide a wing arrangement having a foldable wing which is safe and reliable in operation and has at the same time of a simple construction.

A wing arrangement for an aircraft is disclosed herein in which the wing arrangement comprises a wing having a base section and a tip section.

The base section has a first end portion, which is adapted to be secured to the fuselage of an aircraft, and an opposite second end portion. Thus, when the wing is mounted to a fuselage of an aircraft at its first end portion the second end portion of the base section is remote from the fuselage, i.e., a terminal end of the first end portion constitutes the inboard end of the base section and of the entire wing and an opposite terminal end of the second end portion constitutes the outboard end of the base section.

The tip section has a third end portion and an opposite fourth end portion. The third end portion is pivotably connected to the second end portion such that the tip section is pivotable about a pivot axis between a deployed position and a stowed position in which the spanwise length of the wing is smaller than in the deployed position. In other words, when two of the wings are mounted to opposite sides of a fuselage of an aircraft, the length of the shortest straight line between the outermost wingtips of the two wings is larger—and preferably maximized—in the deployed position than in the stowed position, i.e., the length of the wing measured along the y-axis or pitch axis of the aircraft is larger—and preferably maximized—in the deployed position than in the stowed position. In particular, the distance between the first end portion and the fourth end portion may be larger—and preferably maximized—in the deployed position than in the stowed position.

Thus, when the wing is mounted to a fuselage of an aircraft at its first end portion, and at least in the deployed position of the tip section, the third end portion of the tip section is spaced from the fuselage by the base section and the fourth end portion is the outermost portion of the wing, i.e., a terminal end of the third end portion constitutes the inboard end of the tip section and an opposite terminal end of the fourth end portion constitutes the outboard end of the tip section and of the entire wing.

It is to be noted that, in case the wing includes a wing tip device, the tip section may be identical to the wing tip device, but the tip section may comprise the wing tip device and additionally a further portion of the wing at the inboard side of the wing tip device. In this regard, in the usual manner wing tip devices are understood as devices or wing sections installed at the outermost end of a wing and being adapted to increase the effective aspect ratio of a wing without materially increasing the wingspan and to reduce drag by partially recovering the energy of tip vortices.

The wing arrangement further comprises an actuating arrangement.

The actuating arrangement comprises a linear hydraulic actuator, which, in the usual manner, comprises a cylinder defining a cylinder chamber and a piston movably arranged in the cylinder chamber and sealingly dividing the cylinder chamber into a first chamber section and a second chamber section. The sizes or volumes of the chamber sections change upon movement of the piston. When the pressure inside the first chamber section is higher than the pressure inside the second chamber section the piston moves to increase the volume of the first chamber section and to decrease the volume of the second chamber portion, and vice versa. The chamber is preferably elongate and straight, such as cylindrical, and the piston is movable along a longitudinal axis of the chamber. Preferably a piston rod is coupled to the piston and moves together with the piston. Preferably, the linear hydraulic actuator may comprise only a single cylinder and a single piston and preferably also only a single piston rod.

The linear hydraulic actuator is coupled between the base section and the tip section such that the linear hydraulic actuator is operable to selectively move the tip section between the deployed position and the stowed position. In the usual manner this is effected by movement of the piston, which is in turn effected by selectively changing the hydraulic pressure inside the first and second chamber sections, as described above and as will also be explained further below. For example, the cylinder may be coupled to one of the base section and the tip section and a piston rod of the linear hydraulic actuator may be coupled to the other one of the base section and the tip section. The deployed position and the stowed position may be defined by the linear hydraulic actuator alone, but are preferably defined by corresponding end stops lone or in combination with the linear hydraulic actuator.

The actuating arrangement further comprises a first hydraulic connection portion which is connected to the actuator such that it is in fluid communication with the first chamber section. The first hydraulic connection portion may preferably be a first hydraulic line or comprise a first hydraulic line, possibly together with a first hydraulic fluid terminal of the cylinder in fluid communication with the first chamber section, but may also merely be constituted by such first hydraulic fluid terminal. In any case, in other words, pressurized hydraulic fluid is deliverable through the first hydraulic connection portion into the first chamber section, i.e. into the cylinder chamber on a first side of the piston, independent of the position of the piston. If the supply of pressurized hydraulic fluid into the first chamber section is effected in such a way that the hydraulic pressure is higher in the first chamber section than in the second chamber section, the piston is moved in the above-described way, and for example such that a hydraulic force is applied to the actuator to move the tip section towards the deployed position.

The actuating arrangement also comprises a second hydraulic connection portion which is connected to the actuator such that it is in fluid communication with the second chamber section. Similar to the first hydraulic connection portion, the second hydraulic connection portion may preferably be a second hydraulic line or comprise a second hydraulic line, possibly together with a second hydraulic fluid terminal of the cylinder in fluid communication with the second chamber section, but may also merely be constituted by such second hydraulic fluid terminal. In any case, in other words, pressurized hydraulic fluid is deliverable through the second hydraulic connection portion into the second chamber section, i.e. into the cylinder chamber on a second side of the piston opposite the above-mentioned first side, independent of the position of the piston. If the supply of pressurized hydraulic fluid into the second chamber section is effected in such a way that the hydraulic pressure is higher in the second chamber section than in the first chamber section, the piston is moved in the above-described way, and for example such that a hydraulic force is applied to the actuator to move the tip section towards the stowed position.

Moreover, the actuating arrangement comprises a first hydraulic subsystem and a second hydraulic subsystem, which together with the first and second hydraulic connection portions form a part of or constitute a hydraulic system for hydraulically operating the linear hydraulic actuator. Each of the first and second hydraulic subsystems is connected to and branches off both of the first and second hydraulic connection portions. Further, each of the first and second hydraulic subsystems is operable to supply pressurized hydraulic fluid—and thus provide hydraulic pressure—to the first and second hydraulic connection portions. Thus, in other words, in the usual manner, each of the first and second hydraulic subsystems is operable to conduct or force pressurized hydraulic fluid into a selected one of the first and second hydraulic connection portions—and thereby into the respective chamber section—and to receive or extract pressurized hydraulic fluid from the other one of the first and second hydraulic connection portions—and thereby from the respective chamber section.

The wing arrangement also comprises a first shut-off valve—or separation valve—which is located between the first hydraulic subsystem and both of the first and second hydraulic connection portions. Thus, the first shut-off valve is also located between the first hydraulic subsystem and the second hydraulic subsystem. The first shut-off valve is operable to selectively separate the first hydraulic subsystem from the first and second hydraulic connection portions and, thus, also from the second subsystem and from the linear hydraulic actuator.

The first hydraulic subsystem comprises a first hydraulic supply including a first connector assembly adapted to be connected to a first hydraulic system of an aircraft, which first hydraulic system is operable to supply a plurality of consumers of the aircraft with pressurized hydraulic fluid, i.e. hydraulic pressure. Thus, the first hydraulic subsystem is adapted to be connected to an external source of pressurized hydraulic fluid, i.e., to an external hydraulic power supply.

The second hydraulic subsystem comprises a motor, which may be a fixed displacement or a variable displacement motor, and a pump, which may be a fixed displacement or a variable displacement pump. The motor is coupled via a motor output shaft to the pump such that it is operable to drive the pump to pump hydraulic fluid contained in the second hydraulic subsystem to the first and second hydraulic connection portions to supply pressurized hydraulic fluid to the first and second hydraulic connection portions, as already described in detail above.

The above-described wing arrangement is of a simple construction and is nevertheless capable of providing for reliable redundancy for the operation of the linear hydraulic actuator, because each of the first and second hydraulic subsystems may be preferably constructed to be individually capable of operating the linear hydraulic actuator. Further, upon construction the wing arrangement can be configured in a very flexible manner.

For example, it can be configured for a first mode of operation, in which the linear hydraulic actuator is normally operated using only the first hydraulic subsystem while the pump of the second hydraulic subsystem is not operating. Then, in case of a failure of the first hydraulic subsystem the linear hydraulic actuator is operated using only the second hydraulic subsystem by operating the pump in the above-described manner, while the first hydraulic subsystem is separated from the second hydraulic subsystem and from the linear hydraulic actuator by the first shut-off valve. In this first mode of operation, the second hydraulic subsystem is normally passive, so that it may be designated as an active/passive mode, and each of the first and second hydraulic subsystems are preferably adapted to operate the linear hydraulic actuator with the same operating characteristics, such as, e.g., speed of movement between the deployed and stowed positions. Such active/passive mode has the advantage of a reduced system complexity required for control and monitoring, because it is easier to detect failure in the respective subsystem.

Alternatively or additionally the wing arrangement can be configured for a second mode of operation, in which the linear hydraulic actuator is normally operated using both the first hydraulic subsystem and the second hydraulic subsystem, i.e. the second hydraulic subsystem is operated by operating the pump in the above-described manner while at the same time the first hydraulic subsystem is operated and in fluid communication with the linear hydraulic actuator. Then, in case of a failure of one of the two hydraulic subsystems the linear hydraulic actuator is operated using only the other one of the two hydraulic subsystems, while the one of the two hydraulic subsystems is separated from the other one of the two hydraulic subsystems and from the linear hydraulic actuator by the first shut-off valve or by a similar shut-off valve for the second hydraulic subsystem, as will be explained in more detail below. In this second mode of operation, both the first and the second hydraulic subsystem is normally active, so that it may be designated as an active/active mode, and it is possible to reduce the dimensions or power requirements of the first and second hydraulic subsystems, and therefore also the total weight of the wing arrangement, as long as it is possible to operate the linear hydraulic actuator with each of the two hydraulic subsystems alone, albeit with lower operating characteristics, such as, e.g., speed of movement between the deployed and stowed positions.

In an embodiment, the linear hydraulic actuator is the only linear hydraulic actuator, and preferably the only actuator, coupled between the base section and the tip section and operable to move the tip section between the deployed and stowed positions. This advantageously takes into account that the available space in the region of the second and third end portions is typically very limited, so that it may be difficult to find an arrangement including multiple actuators.

In an embodiment, the pivot axis is oriented in a direction extending between a first edge and a second edge of the wing opposite to each other in a chord direction of the wing, and preferably in a or the local chord direction. Thus, when moving the tip section from the deployed position into the stowed position, the tip section is pivoted downwardly or, preferably, upwardly with respect to the base section. This pivoting movement is particularly simple to implement utilizing a linear hydraulic actuator.

In an embodiment, each of the first and second hydraulic subsystems is adapted to effect movement of the tip section between the deployed and stowed positions independent of the other one of the first and second subsystems, i.e., each of the two subsystems constitutes an independent hydraulic power supply and hydraulic system adapted to actuate the linear hydraulic actuator individually when the other hydraulic power supply is not utilized or available. This provides for full redundancy, as already noted above and as described above in an exemplary manner with respect to the two modes of operation designated as active/passive and active/active.

In an embodiment, the second hydraulic subsystem comprises a second hydraulic supply including a second connector assembly separate from the first connector assembly and adapted to be connected to a second hydraulic system of an aircraft, which second hydraulic system is operable to supply a plurality of consumers of the aircraft with pressurized hydraulic fluid, i.e. hydraulic pressure. Thus, in this embodiment, similar to the first hydraulic subsystem the second hydraulic subsystem is likewise adapted to be connected to an external source of pressurized hydraulic fluid, i.e., to an external hydraulic power supply. In this embodiment the motor is a hydraulic motor connected to the second hydraulic supply and operable to be driven by pressurized hydraulic fluid supplied by the second hydraulic supply. The part of the second hydraulic subsystem, in which hydraulic fluid is pumped by the pump, acts as a local independent hydraulic system after closing the first shut-off valve, and the first and second hydraulic power supplies are advantageously separated from each other by the pump and motor arrangement.

In this embodiment, there is preferably also a pressure control arrangement adapted to provide for a predetermined minimum hydraulic pressure and to prevent occurrence of negative pressure. For example, to achieve these effects the second hydraulic subsystem may preferably comprise a hydraulic accumulator, which acts as a hydraulic reservoir adapted to store hydraulic fluid—i.e. generally a hydraulic reservoir adapted to provide pressurized hydraulic fluid with a predetermined minimum pressure—, and a pressure relief valve connectable or arranged between the hydraulic accumulator and the suction side of the hydraulic pump. The pressure relief valve is normally closed and adapted to open when a predetermined hydraulic pressure is exceeded to thereby connect the suction side of the pump to the hydraulic accumulator. This allows the hydraulic accumulator to assist the pump in case of insufficient supply of pressurized hydraulic fluid at the suction side and to receive pressurized hydraulic fluid from the suction side if the hydraulic pressure at the suction side is too high, and thereby allows the hydraulic accumulator to maintain the return pressure or a particular hydraulic pressure at the suction side of the hydraulic pump. In this embodiment the hydraulic accumulator is connected via separate check valves to the first and second hydraulic connection portions in such a manner that the hydraulic accumulator is operable to serve as a source of pressurized hydraulic fluid, i.e., a separate hydraulic pressure source, in case the hydraulic pressure at the suction side of the hydraulic pump is lower than the hydraulic pressure in the hydraulic accumulator. This may be achieved by suitably configuring and arranging the check valves. It is to be noted that the hydraulic accumulator may be filled with pressurized hydraulic fluid during maintenance or preparation of the respective aircraft, or that the hydraulic accumulator is connected via a check valve to the first hydraulic subsystem or, if present, the first hydraulic supply, so that it is filled with pressurized hydraulic fluid during normal operation of the two subsystems.

This embodiment provides the advantage that the two hydraulic subsystems are configured and constructed in the same manner.

In an alternative embodiment the motor is an electric motor, so that different from the preceding embodiment no external source of pressurized hydraulic fluid is necessary for drive the motor. The pump is operable to pump hydraulic fluid contained in the part of the second hydraulic subsystem, in which the hydraulic fluid is pumped by the pump, to the first and second hydraulic connection portions in the manner described in detail above, i.e., to a selected one of the first and second hydraulic connection portions, when driven by the motor. The second hydraulic subsystem, and in particular the part of the second hydraulic subsystem in which hydraulic fluid is pumped by the pump, again acts as a local independent hydraulic system after closing the first shut-off valve. Providing the motor as an electric motor may be advantageous if it is not possible or difficult, for example due to space constraints, to provide two independent hydraulic power supplies or hydraulic subsystems with sufficient supply characteristics at the tip section. Providing the motor as an electric motor also provides the advantage that the tip section can still be moved and the wing arrangement can still be operated in the manner described herein if hydraulic power is not available, such as, e.g., during maintenance.

In this embodiment, there is again preferably also a pressure control arrangement adapted to provide for a predetermined minimum hydraulic pressure and to prevent occurrence of negative pressure. For example, to achieve these effects the second hydraulic subsystem may preferably comprise a hydraulic accumulator, which acts as a hydraulic reservoir adapted to store hydraulic fluid, i.e. generally a hydraulic reservoir adapted to provide pressurized hydraulic fluid with a predetermined minimum pressure. The hydraulic accumulator is connectable to the suction side of the pump via a separation valve. The separation valve is normally closed and is controlled to open when the second hydraulic subsystem is active, i.e. the pump is driven by the motor, to thereby connect the suction side of the pump to the hydraulic accumulator. This allows the hydraulic accumulator to assist the pump in case of insufficient supply of pressurized hydraulic fluid at the suction side and to receive pressurized hydraulic fluid from the suction side if the hydraulic pressure at the suction side is too high, and thereby allows the hydraulic accumulator to maintain the return pressure or a particular hydraulic pressure at the suction side of the hydraulic pump.

If the hydraulic accumulator is provided for in this embodiment, the hydraulic accumulator is preferably connected to the first hydraulic supply via a check valve, such that hydraulic fluid is provided to the hydraulic reservoir by the first hydraulic system if the hydraulic pressure provided by the first hydraulic system is higher than the pressure inside the hydraulic reservoir, so that it is filled with pressurized hydraulic fluid during normal operation of the two subsystems. Of course, it is in principle also possible that the hydraulic reservoir is not connected and not connectable to the first hydraulic supply, but to require it to be filled with pressurized hydraulic fluid during maintenance or preparation of the respective aircraft.

In an embodiment, the wing arrangement further comprises a second shut-off valve—or separation valve—which is located between the second hydraulic subsystem and both of the first and second hydraulic connection portions. Thus, the second shut-off valve is also located between the second hydraulic subsystem and the first hydraulic subsystem. The second shut-off valve is operable to selectively separate the second hydraulic subsystem from the first and second hydraulic connection portions and, thus, also from the first subsystem and from the linear hydraulic actuator. As an alternative to the second shut-off valve or in addition to the second shut-off valve a clutch may be provided between the motor shaft and the pump. If the second shut-off valve is dispensed with, the pump is preferably provided with a brake, which is adapted to brake the pump when the second hydraulic subsystem is not utilized. The latter arrangement may be advantageously used, in particular in the case of an active/passive mode of operation. In case the clutch is provided in addition to the second shut-off valve the brake is not necessary.

In an embodiment, the pump and the motor are bidirectional such that the hydraulic fluid contained in the second hydraulic subsystem is pumped to the first hydraulic connection portion or to the second hydraulic connection portion depending on the direction in which the motor is driven by the pump. Alternatively, the pump and the motor may be unidirectional and the second hydraulic subsystem may then further include a selection valve which can be selectively switched between a first position in which the hydraulic fluid contained in the second hydraulic subsystem is pumped to first hydraulic connection portion and a second position in which the hydraulic fluid contained in the second hydraulic subsystem is pumped to second hydraulic connection portion.

In an embodiment, the wing arrangement further comprises a latching device or arrangement, which has one or more latching elements which are selectively movable between a latching position and a release position. The configuration and arrangement of the one or more latching elements are such that when the tip section is in the deployed position and the one or more latching elements are moved from the release position to the latching position the one or more latching elements engage one of the tip section and the base section and thereby prevent the tip section from moving out of the deployed position. A support of the latching device, with respect to which support the one or more latching elements are movable, is then preferably fixedly secured to the other one of the tip section and the base section. Further, when the tip section is in the deployed position and the one or more latching elements are moved from the latching position to the release position the tip section or the base section is able to disengage from the one or more latching elements, so that the tip section is able to move from the deployed position into the stowed position.

The wing arrangement then also comprises one or more first latching actuators, which are preferably hydraulic but may also be electric, and one or more second latching actuators, which are preferably hydraulic but may also be electric. The one or more first latching actuators are operable to move the one or more latching elements from the latching position into the release position independent of the one or more second latching actuators, and, conversely, the one or more second latching actuators are operable to move the one or more latching elements from the latching position into the release position independent of the one or more first latching actuators. The one or more first latching actuators may be one or more first hydraulic latching actuators and the one or more second latching actuators are one or more second hydraulic latching actuators, the one or more first latching actuators are connected to and operable by the first hydraulic subsystem, and the one or more second latching actuators are connected to and operable by the second hydraulic subsystem, thereby providing for full redundancy in the operation of the latching device. In the case of electrically powered first and second latching actuators the one or more first latching actuators are driven by first electric drive means and the one or more second latching actuators are driven by separate second electric drive means, thereby again providing for full redundancy in the operation of the latching device.

In this embodiment, the one or more first latching actuators are operable to move the one or more latching elements from the release position into the latching position independent of the one or more second latching actuators, and, conversely, the one or more second latching actuators are operable to move the one or more latching elements from the release position into the latching position independent of the one or more first latching actuators. Alternatively or additionally if the latching device includes at least one biasing device or arrangement, which may be or comprise one or more springs and at least one spring for each latching element. The biasing device is arranged and adapted to bias the at least one latching element into the latching position. The biasing device may assist the one or more first and second latching actuators in moving the one or more latching elements from the release position into the latching position, e.g. in order to preposition them, or they may be the sole means for effecting this movement. In the latter case, the latching elements are normally in the latching position, and active power, preferably active hydraulic power, must be used to move them into the release position. It should be noted that it is also possible that the biasing device includes a dead-center position, on both sides of which it biases the one or more latching elements into a different one of the release position and the latching position. Then, the one or more first latching actuators as well as, independently, the one or more second latching actuators may be operable to move the one or more latching elements towards and over the dead-center position of the biasing device, and the biasing device may then effect the final movement into the release position or the latching position, as the case may be, either alone or together with the one or more first latching actuators or the one or more second latching actuators.

In the above embodiments comprising a latching device or arrangement, it is possible that the biasing device, if provided, exerts sufficient force on the one or more latching elements in the latching position to securely retain them in the latching position against forces acting on them during operation of an aircraft to which the wing arrangement is attached, such as forces from acceleration from runway bumps, braking and turns, wind loads from taxiing, maximum gusts and jet blasts. If the biasing device or arrangement does not provide sufficient force or is not present, the wing arrangement may also comprise a locking device having one or more locking elements which are selectively movable between a locking position and an enabling position. The configuration and arrangement of the one or more locking elements are such that when the one or more latching elements are in the latching position and the one or more locking elements are moved from the enabling position to the locking position the one or more locking elements engage the one or more latching elements and prevent the one or more latching elements from moving out of the latching position. Further, when the one or more latching elements are in the latching position and the one or more locking elements are moved from the locking position to the enabling position the one or more latching elements are able to move from the latching position into the release position.

The wing arrangement then also comprises one or more first locking actuators, which are preferably hydraulic but may also be electric, and one or more second locking actuators, which are preferably hydraulic but may also be electric. The one or more first locking actuators are operable to move the one or more locking elements from the locking position into the enabling position—and preferably also from the enabling position into the locking position—independent of the one or more second locking actuators, and, conversely, the one or more second locking actuators are operable to move the one or more locking elements from the locking position into the enabling position—and preferably also from the enabling position into the locking position—independent of the one or more first locking actuators. In a case in which the one or more first locking actuators are one or more first hydraulic locking actuators and the one or more second locking actuators are one or more second locking latching actuators, the one or more first hydraulic locking actuators are connected to and operable by the first hydraulic subsystem, and the one or more second hydraulic locking actuators are connected to and operable by the second hydraulic subsystem, thereby providing for full redundancy in the operation of the locking device. In the case of electrically powered first and second locking actuators the one or more first locking actuators are driven by first electric drive means and the one or more second locking actuators are driven by separate second electric drive means, thereby again providing for full redundancy in the operation of the locking device.

Similar to the case of the latching device, the locking device may likewise comprise at least one biasing device or arrangement, which may preferably be or comprise one or more springs and preferably at least one spring for each locking element. This locking element biasing device is arranged and adapted to bias the at least one locking element into the locking position. The locking element biasing device may assist the one or more first and second locking actuators in moving the one or more locking elements from the enabling position into the locking position, e.g. in order to preposition them, or they may be the sole means for effecting this movement. In the latter case, the locking elements are normally in the locking position, and active power, preferably active hydraulic power, must be used to move them into the enabling position. It should be noted that it is also possible that the locking element biasing device includes a dead-center position, on both sides of which it biases the one or more locking elements into a different one of the enabling position and the locking position. Then, the one or more first locking actuators as well as, independently, the one or more second locking actuators may be operable to move the one or more locking elements towards and over the dead-center position of the locking element biasing device, and the locking element biasing device may then effect the final movement into the enabling position or the locking position, as the case may be, either alone or together with the one or more first locking actuators or the one or more second locking actuators.

In any if the above embodiments comprising a latching device or arrangement, and possibly also a separate locking device or arrangement, it is possible that the same latching device, and possibly also the same locking device, is also configured and operable in the same manner such that when the tip section is in the stowed position and the one or more latching elements are moved from the release position to the latching position or a different latching position the one or more latching elements engage one of the tip section and the base section and thereby prevent the tip section from moving out of the stowed position, and, when the tip section is in the stowed position and the one or more latching elements are moved from the latching position or the different latching position to the release position the tip section or the base section is able to disengage from the one or more latching elements, so that the tip section is able to move from the stowed position into the deployed position. In this case, the one or more latching elements preferable engage the tip section or the base section, as the case may be, at a different location or portion than in the case of latching the tip section in the deployed position.

Alternatively it is also possible that a separate latching device or arrangement, which has one or more latching elements which are selectively movable between a latching position and a release position and may otherwise be configured and operating in the same manner as described above, is provided as part of the wing arrangement or as a unit or arrangement external to and separate from the wing arrangement and possibly also external to and separate from the aircraft to which the wing arrangement is secured. In any case, such a separate latching device or arrangement, which may in the same manner also include a separate locking device or arrangement, may be designated as ground latching device or arrangement. Whether external to the wing arrangement and aircraft or not it may comprise two hydraulic terminals to which an external hydraulic power source may be connected when the aircraft is on the ground or to which, preferably, the first and second hydraulic subsystems or first and second hydraulic systems of the aircraft are connected in order to operate the first and second latching actuators, and possibly the first and second locking actuators. In any case, the tip section then preferably comprises one or more engagement portions for the separate latching device or arrangement, which engagement portions are engageable by the latching elements in the stowed position of the tip section.

The wing arrangement preferably comprises two separate control units or computers or, preferably, terminals for connection to two separate control units or computers, which are each adapted to control the operation of the wing arrangement described above for each of the embodiments, such as moving the tip section between the deployed and stowed positions, latching and unlatching the tip section and locking and unlocking the tip section. In case the control units are provided as part of the wing arrangement, the wing arrangement preferably comprises a terminal for connection to an actuating element of an aircraft, such as an actuating lever, and the two control units are then adapted to receive control commands from the actuating element and to control the operation of the wing arrangement accordingly. In particular, such an actuating element may be adapted to selectively transmit a first instruction or set of instructions and a different second instruction or set of instructions, wherein the first instruction or set of instructions effects all of the above operations for moving the tip section to the deployed position and for securely retaining it therein, and the second instruction or set of instructions effects all of the above operations for moving the tip section to the stowed position and for securely retaining it therein. Further, the wing arrangement preferably comprises a plurality of sensors which are arranged and adapted to sense the operation of the first and second hydraulic subsystems and of the linear hydraulic actuators, such as the position and/or operation of the various actuators mentioned above, and to provide corresponding sensor signals. The sensors are then connected to the two control units or to sensor terminals for connection to two external control units, and the control units are adapted to process the sensor signals and to control the wing arrangement depending on the sensor signals, for example by switching from the first hydraulic subsystem to the second hydraulic subsystem in the manner described above in case the sensor signals indicate failure of the first hydraulic subsystem.

The first and second hydraulic subsystems and, if present, the latching arrangement and the locking arrangement may preferably and advantageously be located outside a wing box of the wing, i.e., forward of a front spar and/or rearward of a rear spar, and in particular a wing box of the base section. By contrast, the linear hydraulic actuator and, if present, the ground latching device or arrangement are preferably located inside the wing box of wing, and in particular the wing box of the base section.

The wing arrangement according to any of the above-described embodiments may be part of an aircraft. The aircraft further comprises a fuselage, wherein the first end portion of the base section is attached to the fuselage and the base section is arranged between the fuselage and the tip section, and a first hydraulic system, which first hydraulic system is operable to supply a plurality of consumers of the aircraft with pressurized hydraulic fluid and which is connected to the first connector assembly. In embodiments of the wing arrangement also comprising the second connector assembly, the aircraft preferably further comprises a second hydraulic system, which second hydraulic system is operable to supply a plurality of consumers of the aircraft with pressurized hydraulic fluid and which is connected to the second connector assembly. In these cases the first hydraulic system is preferably separate from the second hydraulic system, i.e. the second hydraulic system is independent or not in fluid communication with the first hydraulic system.

The aircraft preferably comprises the two control units or computers and the actuating element mentioned above within the fuselage of the aircraft.

It is to be noted that although two hydraulic subsystems have been described above for actuating the linear hydraulic actuator, it is in principle also conceivable to replace the second hydraulic subsystem by electric drive means for moving the linear hydraulic actuator—as well as the latching actuators and the locking actuators, if present—or the tip section as such—and the latching elements and locking elements, if present.

SUMMARY OF DRAWINGS

In the following exemplary embodiments of the present invention will be explained in detail with reference to the drawings.

FIGS. 1a and 1b show a schematic top view of an aircraft including two wing arrangements according to the embodiments of the present invention, which are secured to opposite sides of the fuselage of the aircraft.

FIG. 2b shows a schematic partial top view of the outboard end portion of the wing arrangement of FIG. 2a.

FIG. 2c shows a further schematic partial perspective view of the outboard end portion of the wing arrangement of FIG. 2a.

FIG. 3a shows a partial perspective view of a latching device of the wing arrangement of FIG. 2a.

FIG. 3b shows a further partial perspective view of a latching device of the wing arrangement of FIG. 2a.

DETAILED DESCRIPTION OF INVENTION

Figure 2A:
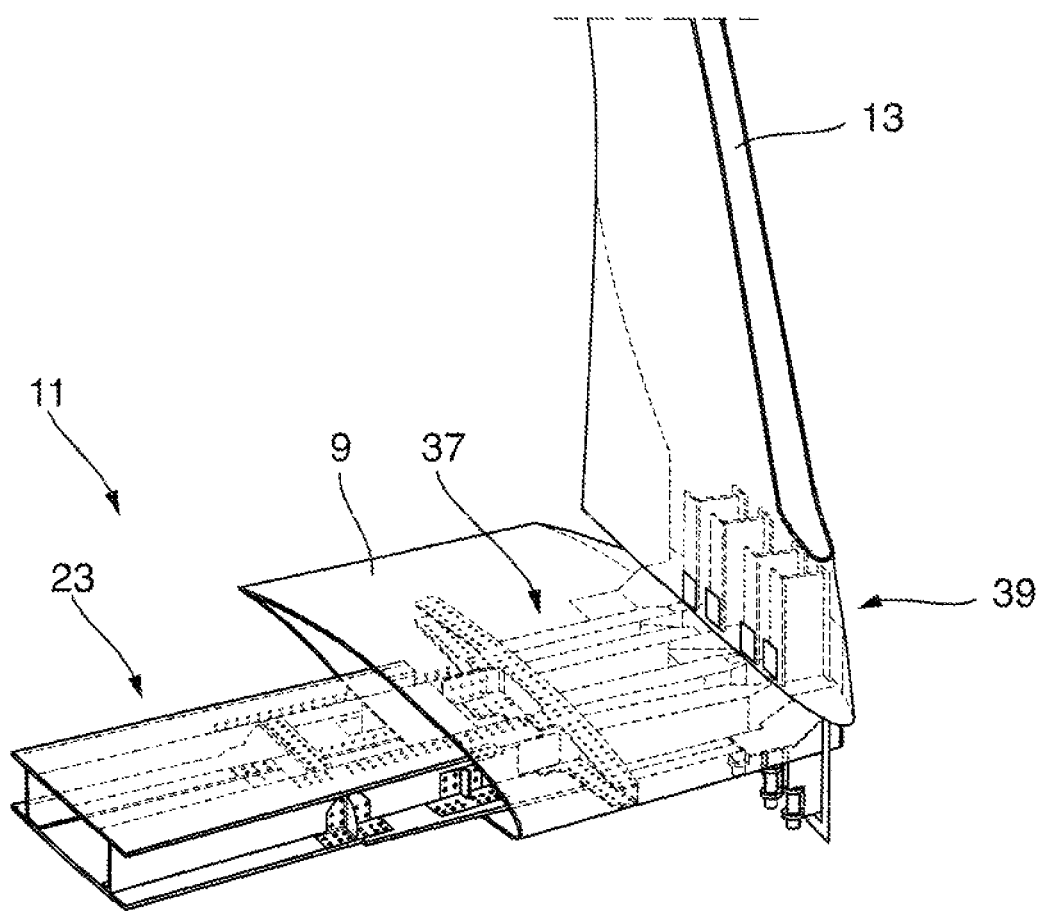
FIG. 2a shows a schematic partial perspective view of an outboard end portion of an embodiment of the wing arrangement according to the present invention.

FIG. 1a shows a schematic top view of an aircraft 1 which comprises two wing arrangements 3 and FIG. 1b shows an enlarged view of the end of one of the wing arrangements. The aircraft 1 also comprises a fuselage 5 extending along a longitudinal axis 7 which corresponds to the x-axis of the aircraft 1. Each of the wing arrangements 3 comprises a wing 9 that extends away from the fuselage 5, and each wing 9 comprises a base section 11 and a tip section 13. The base section 11 has a first or inboard end portion 11a, which is configured or adapted to be coupled to the fuselage 5 and is shown to be coupled to the fuselage 5, and an opposite second or outboard end portion 11b spaced from the fuselage 5 by the remainder of the base section 11.

The tip section 13 of the wing 9 is pivotably connected to the second end portion 11b of the base section 11. More particularly, the tip section 13 extends away from the second or outboard end portion 11b of the base section 11 and comprises a third or inboard end portion 13a and an opposite fourth or outboard end portion 13b spaced from the base section 11 by the remainder of the tip section 13 (as can be seen in the insert of FIG. 1, which shows an outboard end region of one of the wings 9 in enlarged form). The fourth end portion may be provided by a part of a wing tip device 15, which itself is a part of the tip section 13. The third end portion 13a is pivotably mounted on or coupled to the second end portion 11b of the base section 11 in such a manner that the tip section 13 is able to pivot between a deployed position and a stowed position about a pivot axis 17.

The pivot axis 17 generally extends in a direction between a leading edge and a trailing edge of the respective wing 9 and, in the example shown, parallel or essentially parallel to the longitudinal axis 7, i.e., in the flight direction. In the deployed position illustrated in FIG. 1 the tip section 13 extends essentially along the longitudinal axis of the base section 11, and in the stowed position the tip section 13 is angled upwardly with respect to the longitudinal axis of the base section 11, as can be seen in FIGS. 2a and 2c, which will be described in detail below, so that the spanwise length of the wing 9 is decreased. Thus, in the deployed position the fourth end portions or the outermost outboard ends of the tip sections 13 of the wings 9 have a larger distance than in the stowed position, so that the wingspan of the aircraft 1 can be selectively decreased by moving the tip sections 13 of the wings 9 from the deployed position into the stowed position in order to allow for the use of infrastructure adapted to aircraft of such reduced wingspan and in order to save on airport fees, and increased in order to allow for reduced fuel consumption during flight.

Figure 2B:
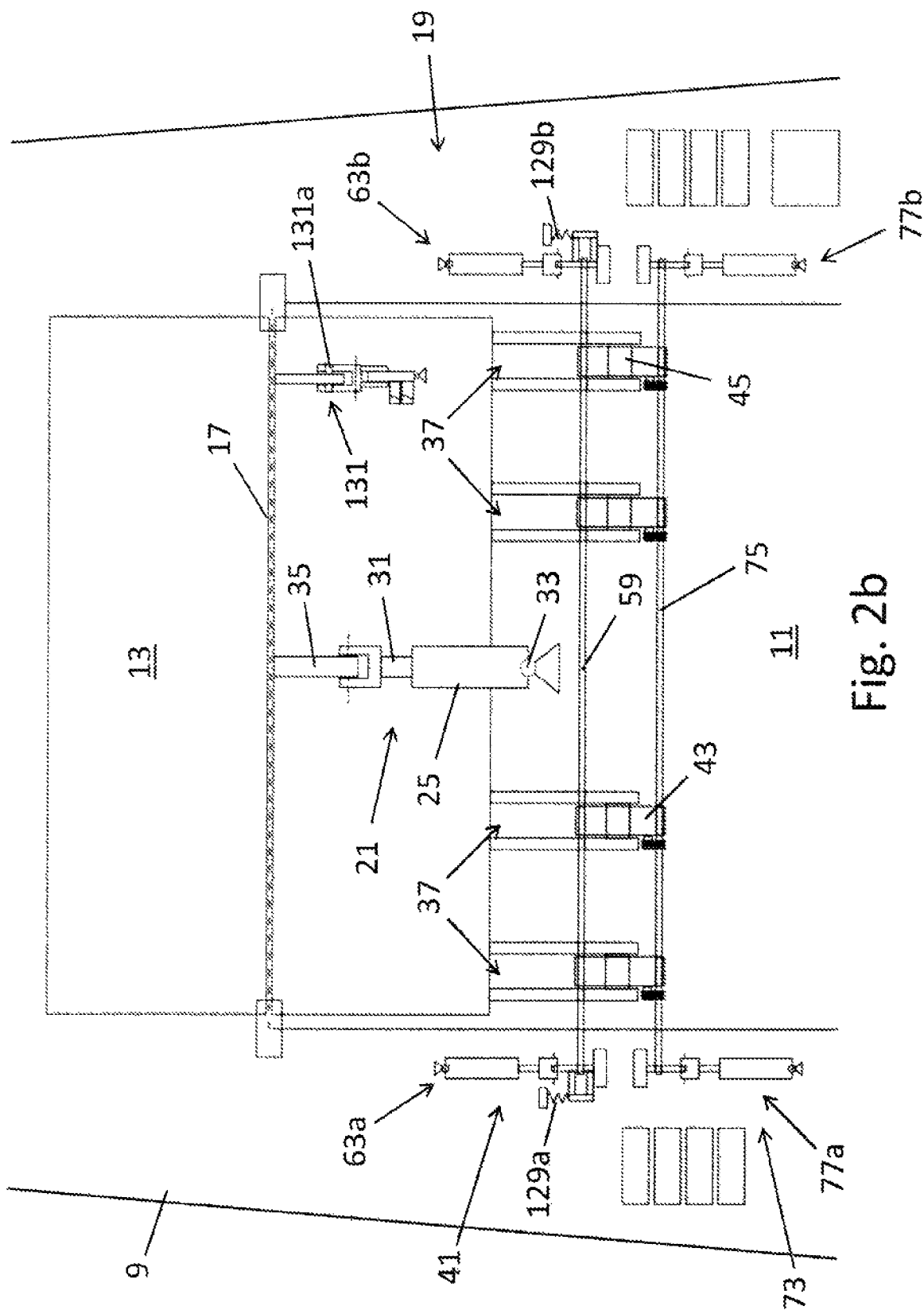
Figure 2C:
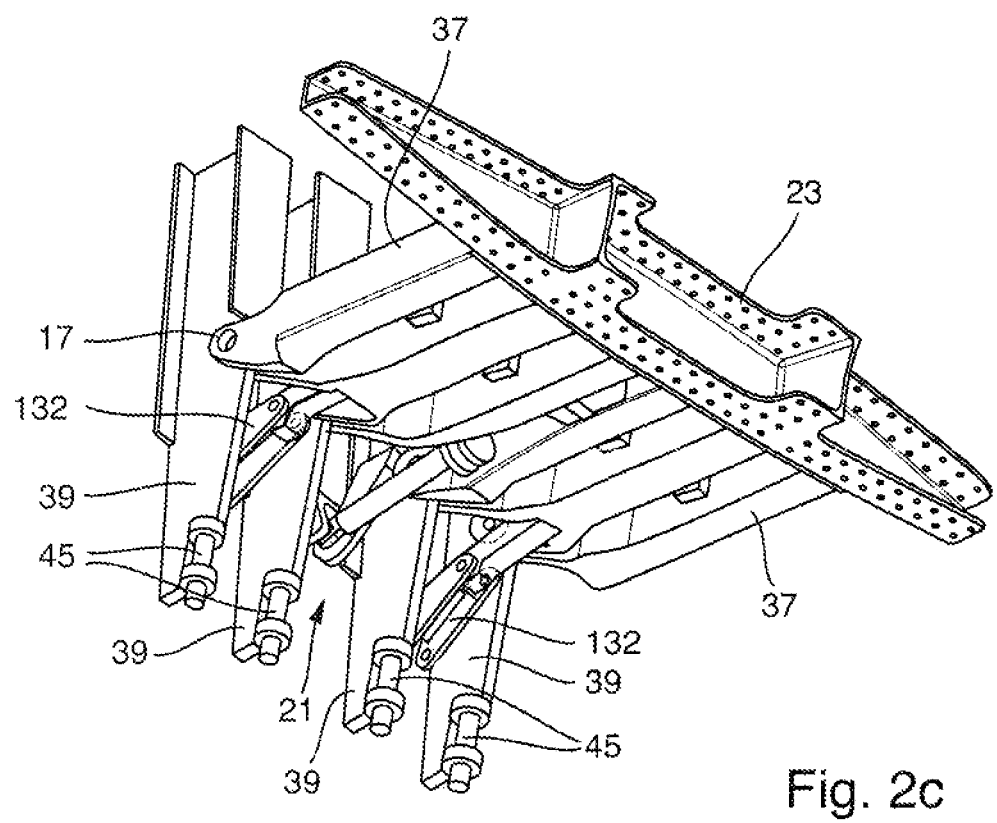
Figure 4:
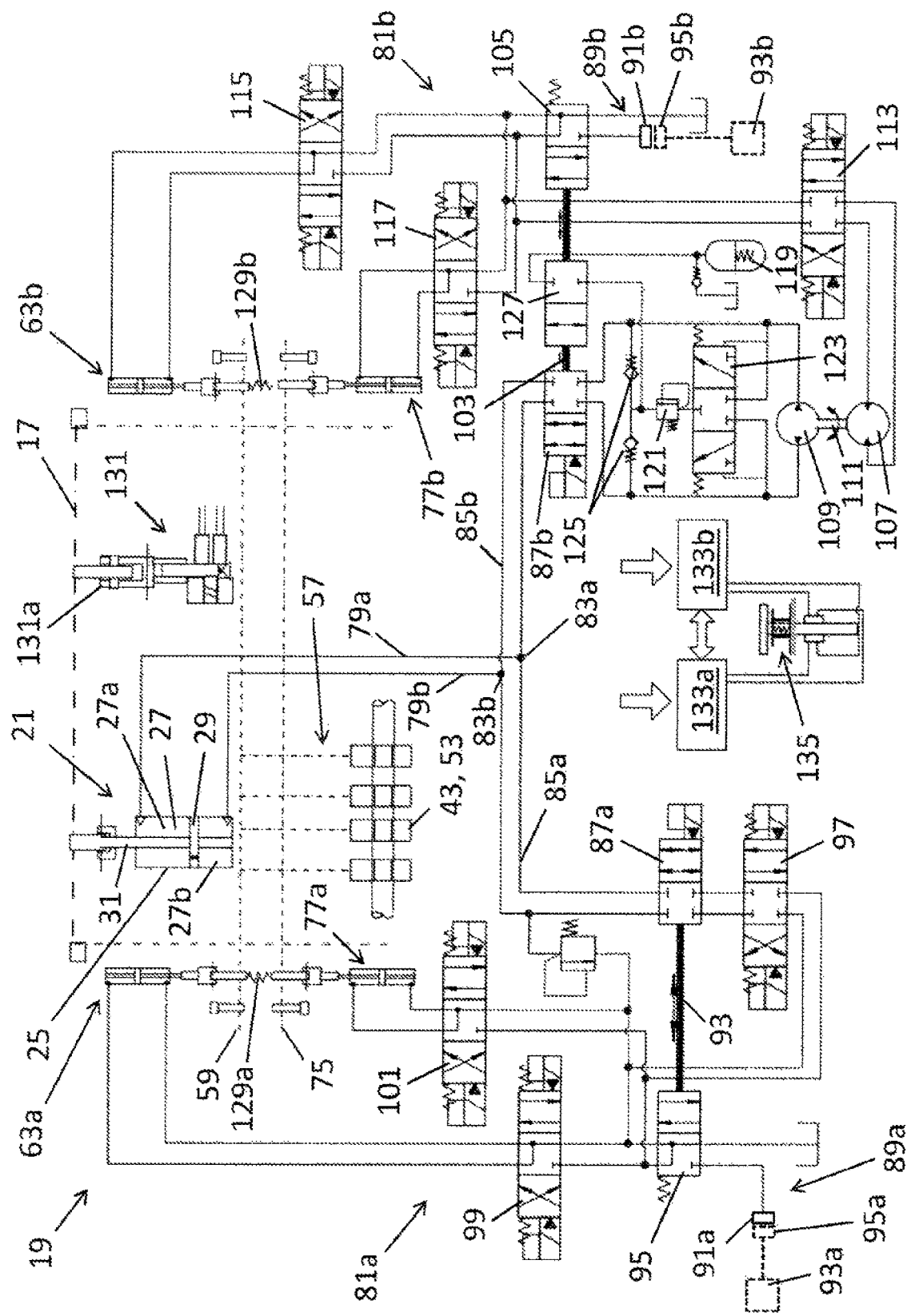
FIG. 4 shows a schematic diagram of a hydraulic system of a first embodiment of the wing arrangement according to the present invention.
Figure 5:
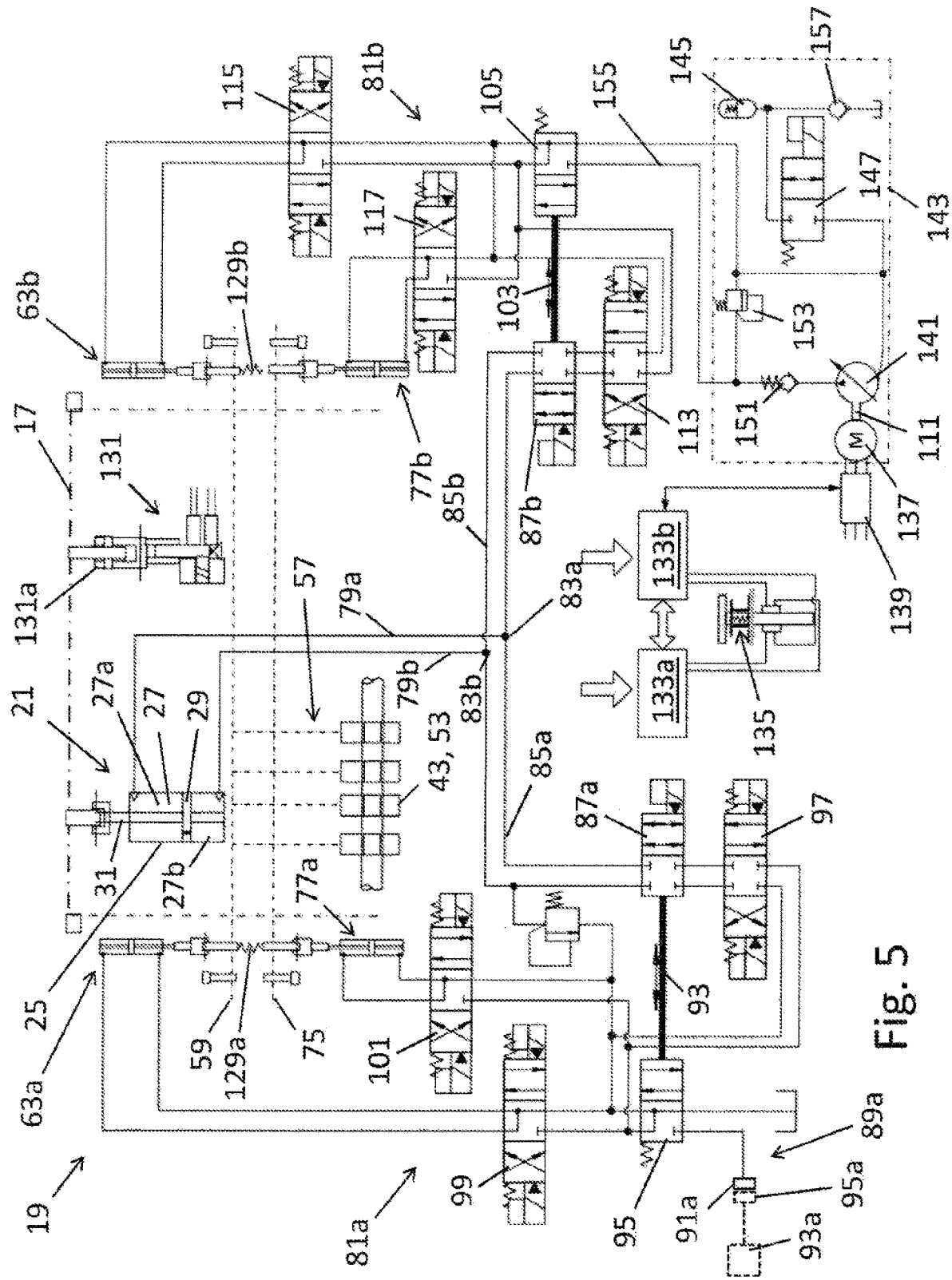
FIG. 5 shows a schematic diagram of a hydraulic system of a second embodiment of the wing arrangement according to the present invention.

In order to effect the pivotal movement of the tip section 13 between the deployed and the stowed positions, each of the wing arrangements 3 comprises an actuating arrangement 19, a part of which is illustrated in FIG. 2b and two embodiments of which are schematically illustrated in FIGS. 4 and 5 to be described further below.

The actuating arrangement comprises a linear hydraulic actuator 21 which is coupled to the base section 11 and to the tip section 13 and which is located inside a wing box 23 of the wing 9 (see the insert in FIG. 1). No other actuator may need to be coupled between the base section 11 and the tip section 13. As can best be seen in FIG. 2b, the linear hydraulic actuator 21 comprises a cylinder 25 defining a cylinder chamber 27, a piston 29 movably arranged in the cylinder chamber 27 and sealingly dividing the cylinder chamber 27 into a first chamber section 27a and a second chamber section 27b (see FIGS. 4 and 5), and a piston rod 31 fixedly secured to the piston 29 and moving together with the piston 29. The cylinder 25 is pivotably secured at an inboard end 33 thereof to the second end portion 11b of the base section 11, and the piston rod 31 extends from the opposite end of the cylinder 25. At the end of the piston rod 31 remote from the cylinder 25 the piston rod is pivotable secured to a fixed portion 35 of the third end portion 13a of the tip section 13. Thus, when operating the linear hydraulic actuator 21 by selectively increasing or decreasing hydraulic pressure in the two chamber sections 27a, 27b relative to each other and thereby selectively moving the piston 31 and extending and retracting the piston rod 31 the tip section 13 is selectively moved between the deployed position (when the piston rod is retracted) and the stowed position (when the piston rod is extended). This operation of the linear hydraulic actuator 21 will be explained in further detail below with reference to FIGS. 4 and 5.

As can be seen in FIGS. 2a and 2c, and partly in FIG. 2b, in order to pivotably couple the base section 11 to the tip section 13 about the pivot axis 17, a plurality of, e.g. four, elongate spaced first support elements 37 provided in the second end portion 11b of the base section 11 and extending from an outboard end of the wing box 23 are pivotably coupled to a plurality of, e.g. four, elongate spaced second support elements 39 provided in the third end portion 13a of the tip section 13.

Figure 3A:
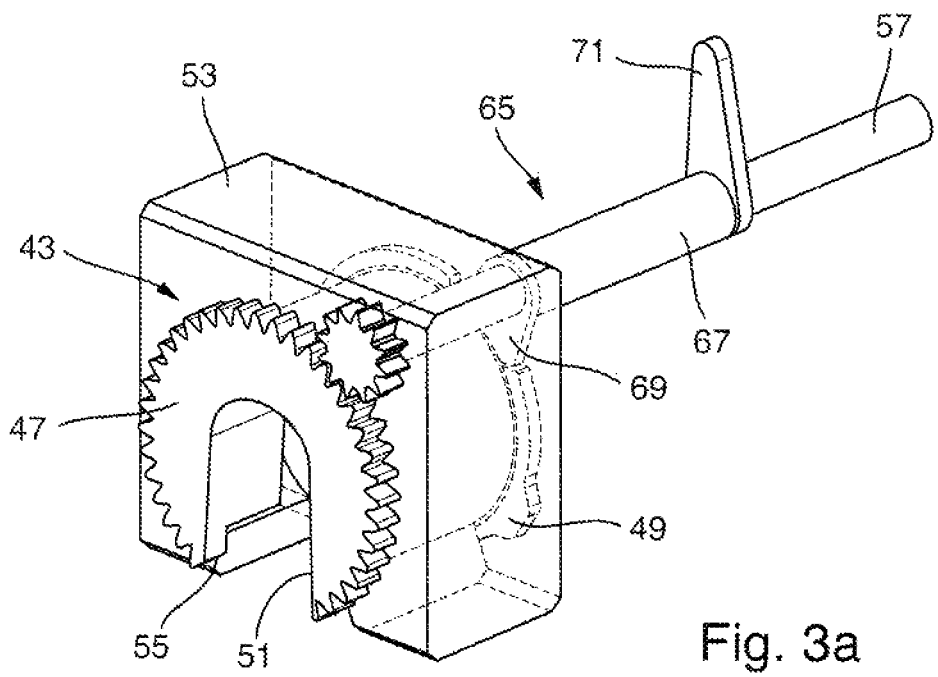
Figure 3B:
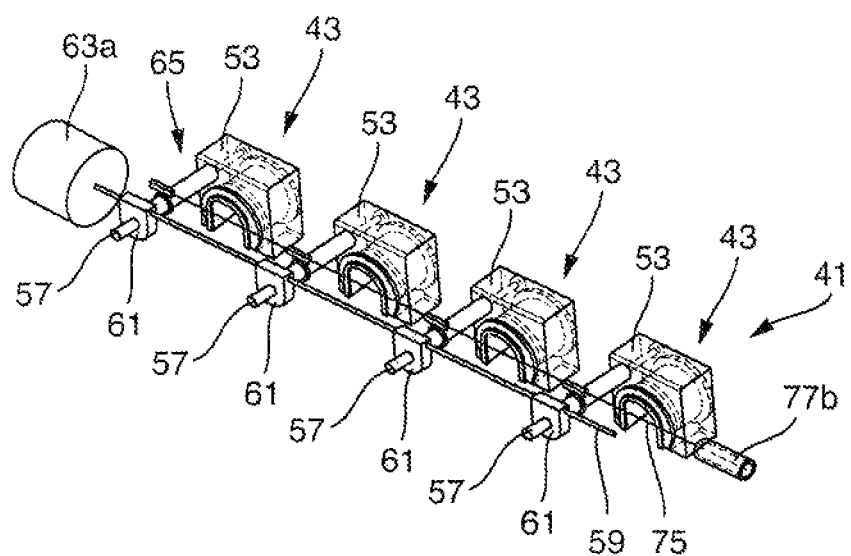

In order to be able to securely maintain the tip section 13 in the deployed position the actuating arrangement 19 also comprises a latching device or arrangement 41, which is shown in detail in FIGS. 3a and 3b, and partly in FIGS. 4 and 5. The latching device 41 comprises a plurality of, e.g. four, toothed latching elements 43, the number and positions of which corresponds to the number of second support elements 39 of the tip section 13. Each such latching element 43 comprises or is constituted by a toothed latching sleeve 47, which is rotatably supported in an associated support casing 53 fixedly mounted on the second end portion 11b of the base section 11 and which comprises at one end face thereof a cam disk portion 49. Each of the toothed latching sleeves 47 comprises a slot or cutout 51 in its circumferential wall, and each support casing 53 likewise comprises a slot or cutout 55, which is arranged and dimensioned such that by rotating the latching sleeve 47 about the longitudinal axis thereof the slot 51 of the latching element 43 can be selectively brought into and out of alignment with the slot 55 of the support casing 53, thereby selectively allowing and preventing, respectively, entry into of an elongate element into the interior of the slot 51 of the latching element 43 and exit out the slot 51. The supports casing 53 are mounted on the second end portion 11b of the base section 11 such that the slots 55 are directed downwardly, i.e., towards the bottom side of the second end portion 11b of the base section 11.

This rotation of the latching sleeves 47 can be selectively effected via associated drive shafts 57, each of which is coupled to a connecting shaft 59 via a respective bevel gear 61. The connecting shaft 59 in turn is driven by a first connecting shaft actuator 63a and second connecting shaft actuator 63b, each of which is adapted to drive the connecting shaft 61 without assistance by the other connecting shaft actuator and only one of which (63a) is shown in FIG. 3b. All of these elements likewise belong to the latching device 41. In FIG. 3b the connecting shaft actuator 63a is only shown schematically. The first and second connecting shaft actuators 63a, 63b may be provided as rotary actuators or motors having a rotating output shaft, or as linear hydraulic actuators, as shown in some more detail in the examples of FIGS. 3a, 4 and 5. Thus, the first and second connecting shaft actuators 63a, 63b are operable to selectively rotate the latching elements 43 and their latching sleeves 47, and they therefore constitute first and second latching actuators.

When the two slots 51, 55 are aligned with each other by suitably rotating the latching element 43, elongate and rod-shaped engagement portions 45 carried on a distal end of each of the second support elements 39 of the tip section 13 are able to enter into the slots 51, 55 to be received in the latching sleeves 47 of the latching elements 43 when the tip section 13 is moved from the stowed position into the deployed position, and the exit the latching sleeves 47 of the latching elements 43 to allow the tip section 13 to be moved from the deployed position into the stowed position. Thus, this position, which is shown in FIGS. 3a and 3b is the release position of the latching device 41.

Consequently, when it is desired to move the tip section 13 into the deployed position or out of the deployed position and the latching device 41 is not yet in the release position, the latching device 41 is at first operated by using one of the first and second connecting shaft actuators 63a, 63b to bring the latching device 41 into the release position. When the tip section 13 has been moved into the deployed position and it is desired to latch the tip section 13 in the deployed position, the latching device 41 is operated by using one of the first and second connecting shaft actuators 63a, 63b to rotate the latching elements 43 and their latching sleeves 47 such that the slots 51, 55 are no longer aligned, thereby preventing exit of the engagement portions 45 from the latching sleeves 47. Thus, this position is the latching position of the latching device 41.

In order to be able to prevent the latching elements 43 to inadvertently leave the release position and the latching position, the actuating arrangement 19 also comprises a locking device or arrangement 73, which is likewise shown in detail in FIGS. 3a and 3b, and partly in FIGS. 4 and 5. Each of the cam disk portions 49 of the latching elements 41 is cooperating with an associated locking element 65, and these locking elements 65 form part of the locking device 73. Each of the locking elements 65 comprises a tubular elongate sleeve portion 67, with which it is received on the drive shaft 57 of the respective latching element 43 such that the sleeve portion 67 is rotatable relative to the drive shaft 57, a first arm 69 and a second arm 71. The first arm 69 and the second arm 71 are arranged to extend from opposite longitudinal ends of the sleeve portion 67 transversely and preferably perpendicularly with respect to a longitudinal axis of the sleeve portion 67. The locking elements 65 are positioned such that their first arms 69 are aligned with the cam disk portions 49 such that the first arms 69 can be selectively brought into and out of engagement with recesses provided in the cam disk portions 49 by rotating the locking elements 65 about the longitudinal axis of the sleeve portions 67, i.e. longitudinal axis defined by the drive shafts 57. This selective engagement and disengagement of the first arms 69 with recesses of the cam disk portions 49 effects locking and unlocking (or enabling), respectively, of the latching device with respect to changing between the latching position and the release position.

In order to be able to selectively effect such rotation of the locking elements 65, the locking device 73 further comprises a drive shaft 75, on which worm gears are fixedly secured each of which is coupled to the second arm 71 of another one of the locking elements 65 such that rotation of the drive shaft 75 effects rotation of the locking elements 65, and a first actuator 77a and a second actuator 77b, which are adapted for rotatably driving the drive shaft 75 and only one of which (77b) is shown in FIG. 3b. Each of the first and second actuators 77a, 77b is adapted to drive the drive shaft 75 without assistance by the other one of the first and second actuators 77a, 77b. In FIG. 3b the second actuator 77b is only shown schematically. The first and second actuators 77a, 77b may be provided as rotary actuators or motors having a rotating output shaft, or as linear hydraulic actuators, as shown in some more detail in the examples of FIGS. 3a, 4 and 5. Thus, the first and second actuators 77a, 77b of the locking device 73 are operable to selectively rotate the locking elements 65 in the above-described manner, and they therefore constitute first and second locking actuators. In addition, it is possible that springs are coupled to the second arms 71 of the locking elements 65, such that they bias the locking elements 65 into the locking position.

When the latching device 41 and its latching elements 43 are in the release position the first arms 69 of the locking elements 65 can be brought into and out of engagement with a corresponding recess in the cam disk portions 49 by suitably rotating the locking elements 65. Similarly, when the latching device 41 and its latching elements 43 are in the latching position the first arms 69 of the locking elements 65 can be brought into and out of engagement with another corresponding recess in the cam disk portions 49 by suitably rotating the locking elements 65. Thus, the locking elements 65 can be selectively moved between a position, in which the first arms 69 are in engagement with one of these recesses and prevent rotation of the latching elements 43, and a position, in which the first arms 69 are not in engagement with one of these recesses and do not prevent rotation of the latching elements 43. The former position constitutes a locking position of the locking device 73, and the latter position constitutes an enabling position of the locking device 73.

FIG. 4 schematically shows a first embodiment of the actuating arrangement 19 in more detail.

In the embodiment of FIG. 4 the actuating arrangement 19 comprises a first hydraulic line 79a, which is connected to the linear hydraulic actuator 21 such that it is in fluid communication with the first chamber section 27a, and a second hydraulic line 79b, which is connected to the linear hydraulic actuator 21 such that it is in fluid communication with the second chamber section 27b. Thus, pressurized hydraulic fluid can be selectively introduced into and removed from the first and second chamber sections 27a, 27b via the first and second hydraulic lines 79a, 79b.

The actuating arrangement further comprises a first hydraulic subsystem 81a and a separate second hydraulic subsystem 81b, which are both connected to the first and second hydraulic lines 79a, 79b at the end thereof opposite to the linear hydraulic actuator 21. More specifically, the first and second hydraulic subsystems 81a, 81b branch off the first and second hydraulic lines 79a, 79b at branching points 83a, 83b via connecting lines 85a and 85b, respectively, so that each the first and second hydraulic subsystems 81a, 81b is able to supply pressurized hydraulic fluid to the first and second hydraulic lines 79a, 79b via the associated connecting lines 85a and 85b, respectively. A first shut-off or separation valve 85a is provided between the first hydraulic subsystem 81a and the branching points 83a, 83b, and similarly a second shut-off or separation valve 85b is provided between the second hydraulic subsystem 81b and the branching points 83a, 83b. The first and second shut-off valves 85a, 85b are selectively operable to separate and connect the first and second hydraulic subsystems 81a, 81b from and to the first and second hydraulic lines 79a, 79b.

The first hydraulic subsystem 81a comprises a first hydraulic supply 89a, which includes a first connector assembly 91a which is adapted to be connected to a first hydraulic system 93a of an aircraft via a mating connector assembly 95a. The first hydraulic system 93a, which is operable to supply a plurality of consumers of the aircraft with pressurized hydraulic fluid, and the mating connector assembly 95a do not form part of the actuating arrangement 19. The first shut-off valve 87a is coupled, e.g. via a shaft 93, to a supply separation valve 95, which allows to connect or disconnect the first hydraulic supply 89a from the remainder of the actuating arrangement 19 and the first hydraulic subsystem 81a. The coupling between the valves 87a and 95 is such that when the first shut-off valve 87a is in its shut-off position the supply separation valve 95 separates the first hydraulic supply 89a, and when the first shut-off valve 87a is in its open position the supply separation valve 95 is likewise in its open position. The supply separation valve 95 is a directional control valve having four ports, wherein two pairs of these ports are connected in the open position of the valve 95 such that flow between each two ports of one of these pairs is only possible in a predetermined direction and the direction for one pair is opposite to the direction of the other pair.

The first hydraulic subsystem 81a further comprises three switching valves 97, 99 and 101, each of which is connected to two ports of the supply separation valve 95 opposite the ports to which the first hydraulic supply 89a is connected, and each of which is a three position valve with four ports having a shut-off position and two open positions with different connections between the four ports to allow switching the flow direction among the ports of the respective valve 97, 99 and 101.

The switching valve 97 is connected between the first shut-off valve 87a and the supply separation valve 95, such that when the valves 87a and 95 are open the switching valve 97 is operable to selectively connected and disconnected the linear hydraulic actuator 21 from the first hydraulic supply 89a and to selectively choose into which of the chamber sections 27a, 27b pressurized hydraulic fluid shall flow and from which of the chamber sections 27a, 27b pressurized hydraulic fluid shall be removed through the hydraulic lines 79a, 79b. Thus, the switching valve 97 also allows to selectively choose the direction of operation of the linear hydraulic actuator 21, i.e. whether the piston rod 31 is to be extended for moving the tip section 13 into the stowed position or retracted for moving the tip section 13 into the deployed position.

The switching valve 99 is connected between the supply separation valve 95 and the first latching actuator 63a, such that when the valves 87a and 95 are open the switching valve 99 is operable to selectively connected and disconnected the first latching actuator 63a, which is configured as a linear hydraulic actuator, from the first hydraulic supply 89a and to selectively choose the direction of operation of the first latching actuator 63a, i.e. whether a piston rod of the first latching actuator 63a is to be extended for rotating the connecting shaft 61 in one direction—e.g. for moving the latching device 41 into the latching position—or retracted for rotating the connecting shaft 61 into the opposite direction—e.g. for moving the latching device 41 into the release position. The latching actuator 63a is cooperating with a spring 129a which is arranged and adapted to bias the latching device 41 into the latching position (see also FIG. 2b).

Similarly, the switching valve 101 is connected between the supply separation valve 95 and the first locking actuator 77a, such that when the valves 87a and 95 are open the switching valve 101 is operable to selectively connected and disconnected the first locking actuator 77a, which is configured as a linear hydraulic actuator, from the first hydraulic supply 89a and to selectively choose the direction of operation of the first locking actuator 77a, i.e. whether a piston rod of the first locking actuator 77a is to be extended for rotating the drive shaft 75 in one direction—e.g. for moving the locking device 73 into the locking position—or retracted for rotating the drive shaft 75 into the opposite direction—e.g. for moving the locking device 73 into the enabling position.

The second hydraulic subsystem 81b comprises a second hydraulic supply 89b, which includes a second connector assembly 91b which is adapted to be connected to a second hydraulic system 93b of an aircraft via a mating connector assembly 95b. The second hydraulic system 93b, which is operable to supply a plurality of consumers of the aircraft with pressurized hydraulic fluid and may be separate from the first hydraulic system 93a of the aircraft, and the mating connector assembly 95b do not form part of the actuating arrangement 19. The second shut-off valve 87b is coupled, e.g. via a shaft portions 103, to a supply separation valve 105, which allows to connect or disconnect the second hydraulic supply 89b from the remainder of the actuating arrangement 19 and the second hydraulic subsystem 81b. The coupling between the valves 87b and 105 is such that when the second shut-off valve 87b is in its shut-off position the supply separation valve 105 separates the second hydraulic supply 89b, and when the second shut-off valve 87b is in its open position the supply separation valve 105 is likewise in its open position. The supply separation valve 105 is a directional control valve having four ports, wherein two pairs of these ports are connected in the open position of the valve 105 such that flow between each two ports of one of these pairs is only possible in a predetermined direction and the direction for one pair is opposite to the direction of the other pair.

Different from the first hydraulic subsystem 81a the second hydraulic subsystem 81b comprises a bidirectional hydraulic motor 107, which is operable to be driven by pressurized hydraulic fluid supplied by the second hydraulic supply 89b, and a bidirectional pump 109, which is driven by an output shaft 111 of the motor 107 such that the motor 107 is operable to drive the pump 109 to pump hydraulic fluid contained in a portion of the second hydraulic subsystem 81b, in which portion the pump 109 is arranged, to the first and second hydraulic connection portions. The motor 107 is arranged in a different portion of the second hydraulic subsystem 81b than the pump 109, and fluid communication via these two portions is interrupted by the motor and pump arrangement 107, 109, 111.

The second hydraulic subsystem 81b further comprises three switching valves 113, 115 and 117, each of which is connected to two ports of the supply separation valve 105 opposite the ports to which the second hydraulic supply 89b is connected, and each of which is a three position valve with four ports having a shut-off position and two open positions with different connections between the four ports to allow switching the flow direction among the ports of the respective valve 113, 115 and 117.

The switching valve 113 is connected between the motor 107 (and the subsequent second shut-off valve 87b) and the supply separation valve 105, such that when the valves 87b and 105 are open the switching valve 113 is operable to selectively connected and disconnected the motor 107 from the second hydraulic supply 89b and to selectively choose the operating direction of the motor 107 and, thus, of the pump 109.

The portion of the second hydraulic subsystem 81b including the pump 109 also comprises a hydraulic accumulator 119 and a pressure relief valve 121, which is connectable via an accumulator separation valve 127, between the hydraulic accumulator 119 and the current suction side of the hydraulic pump 109 via a switching valve 123. The accumulator separation valve 127 is connected between the shaft portions 103, so that it is in the open position when the valves 87b and 105 are in their open position and is in the closed position when the valves 87b and 105 are in their closed position. The switching valve 123 is a directional control valve having three positions and three ports and having a shut-off position and two open positions with different connections between the three ports to selectively allow connection of the hydraulic accumulator 119 to different sides of the pump 109. The pressure relief valve 121 is normally closed and is adapted to open when a predetermined hydraulic pressure is exceeded to thereby connect the current suction side of the pump 109 to the hydraulic accumulator 119. The hydraulic accumulator 119 is connected via separate check valves 125 to the first and second hydraulic connection portions 79a, 79b, so that the hydraulic accumulator 119 is operable to serve as a source of pressurized hydraulic fluid in case the hydraulic pressure at the suction side of the hydraulic pump 109 is lower than the hydraulic pressure in the hydraulic accumulator 119. In this manner, a minimum hydraulic pressure at the output side of the pump 109 can be guaranteed.

Thus, the switching valve 113 allows to selectively choose whether the pressurized hydraulic fluid is to be pumped into the second hydraulic line 79b or the first hydraulic line 79a and, thereby, the direction of operation of the linear hydraulic actuator 21, i.e. whether the piston rod 31 is to be extended for moving the tip section 13 into the stowed position or retracted for moving the tip section 13 into the deployed position.

The switching valve 115 is connected between the supply separation valve 105 and the second latching actuator 63b, such that when the valves 87b and 105 are open the switching valve 115 is operable to selectively connected and disconnected the second latching actuator 63b, which is configured as a linear hydraulic actuator, from the second hydraulic supply 89b and to selectively choose the direction of operation of the second latching actuator 63b, i.e. whether a piston rod of the second latching actuator 63b is to be extended for rotating the connecting shaft 61 in one direction—e.g. for moving the latching device 41 into the latching position—or retracted for rotating the connecting shaft 61 into the opposite direction—e.g. for moving the latching device 41 into the release position. The latching actuator 63b is cooperating with a spring 129b which is arranged and adapted to bias the latching device 41 into the latching position (see also FIG. 2b).

Similarly, the switching valve 117 is connected between the supply separation valve 105 and the second locking actuator 77b, such that when the valves 87b and 105 are open the switching valve 117 is operable to selectively connected and disconnected the second locking actuator 77b, which is configured as a linear hydraulic actuator, from the second hydraulic supply 89b and to selectively choose the direction of operation of the second locking actuator 77b, i.e. whether a piston rod of the second locking actuator 77b is to be extended for rotating the drive shaft 75 in one direction—e.g. for moving the locking device 73 into the locking position—or retracted for rotating the drive shaft 75 into the opposite direction—e.g. for moving the locking device 73 into the enabling position.

Finally, the actuating arrangement 19 comprises a ground latching device 131. In this regard, two double-joints 132 may be provided between the first support elements 37 of the base section 11 and the second support elements 39 of the tip section 13 such that the double-joints 132 are folded when the tip section 13 is in the deployed position and are extended—e.g. fully extended or preferably nearly fully extended—when the tip section 13 is in the stowed position, as can be seen in FIG. 2c. The ground latching device 131 may then comprise, for each double-joint separately, a bolt which is selectively movable in the stowed position of the tip section between a latching position, in which the bolt prevents the double-joint to fold and thereby the tip section to leave the stowed position, and a release position, in which the bolt allows the double joint to fold and thereby the tip section to move from the stowed position into the deployed position. Movement of the bolts may preferably be effected by means of one or more ground latching actuators 131a (see FIGS. 2b, 4 and 5, which may be electrical or preferably hydraulic. For example, hydraulic actuators may be actuated by a solenoid valve connected to a supply of pressurized hydraulic fluid. The ground latching actuators may preferably be single acting actuators which are only operable to move the bolts from the latching position into the release position. Then, the bolts are biased by a biasing arrangement, which preferably comprises one or more springs, into the latching position, so that they are moved into and maintained in the latching position by the biasing arrangement. For reasons of redundancy, each of the bolts is preferably coupled to two or more ground latching actuators, which are driven by independent systems and which are independently operable to effect the above movement of the respective bolt. In particular, hydraulic ground latching actuators for a bolt may be connected to separate hydraulic supply systems, such as separate first and second hydraulic systems of the wing arrangement 3 or the aircraft 1 or the first and second hydraulic subsystems.

The operation of the actuating arrangement is preferably such that normally the second shut-off valve 87b and the supply separation valve 105 are closed and the first shut-off valve 87a and the supply separation valve 95 are open, so that only the first hydraulic subsystem 81a is responsible for operating the linear hydraulic actuator 21, the latching device 41 and the locking device 73, i.e. only the first hydraulic subsystem 81a is active whereas the second hydraulic subsystem 81b is passive. In order to move the tip section 13 from the stowed position into the deployed position the ground latching device 131 is operated to release the tip section 13 therefrom, and, if necessary, the switching valve 99 is operated to bring the locking device 73 into the enabling position and the switching valve 99 is operated to bring the latching device 41 into the release position. Subsequently or simultaneously, the switching valve 97 is switched into the corresponding position, and once the tip section 13 has reached the deployed position the switching valve 99 is operated to latch the tip section 13 in the deployed position by means of the latching device 41, and once the latching device 41 is in the latching position the switching valve 99 is operated to lock the latching device 41 in the latching position by means of the locking device 73. Conversely, in order to move the tip section 13 from the deployed position into the stowed position the switching valve 99 is operated to bring the locking device into the enabling position to unlock the latching device 41 from the latching position, once this has been done the switching valve 99 is operated to bring the latching device 41 into the release position to unlatch the tip section 13 from the deployed position, and then the switching valve 97 is switched into the corresponding position to move the tip section 13 into the stowed position. Once this has been done, the ground latching device 131 is operated to latch the tip section 13 in the stowed position. These sequences of operations are preferably controlled by a control unit 133a and a control lever 135, which are not part of the actuating arrangement 19 or the wing arrangement 3, but are preferably a control computer and a control lever of an aircraft to which the wing arrangement 3 is secured. The control unit 133a reacts to actuation of the control lever 135 to selectively move the tip section 13 into either the stowed or the deployed position.

In case of a failure in the operation of the first hydraulic subsystem 81a, the first latching actuator 63a or the first locking actuator 77a, the first shut-off valve 87a is controlled to move into its closed position, thereby rendering it passive, and the second shut-off valve 87b is controlled to move into its open position together with the supply separation valve 105 and the accumulator separation valve 127, thereby rendering the second hydraulic subsystem 81b active to operate the linear hydraulic actuator 21, the second latching actuator 63b and the second locking actuator 77b. The switching valves 97, 99 and 101 and the supply separation valve 95 are biased into the closed position, so that the first latching actuator 63a and the first locking actuator 77a may reliably and easily be separated from the first hydraulic subsystem 81a at the same time. Then, the switching valve 113, which corresponds in its function to the switching valve 97, the switching valve 115, which corresponds in its function to the switching valve 99, and the switching valve 117, which corresponds in its function to the switching valve 101, are controlled and operated in the same manner as the switching valves 97, 99 and 101 described in detail above in order to operate the linear hydraulic actuator 21, the second latching actuator 63*b* and the second locking actuator 77*b* to selectively move the tip section 13 between the deployed and stowed positions. The only difference is that the switching valve 113 controls the operation of the hydraulic motor 107 and the pump 109 and that, additionally, the switching valve 123 must be suitably controlled. These corresponding sequences of operations are preferably controlled by a control unit 133*b* separate from the control unit 133*a* and the control lever 135, wherein the control unit 133*b* is not part of the actuating arrangement 19 or the wing arrangement 3, but is preferably a control computer of an aircraft to which the wing arrangement 3 is secured. The control unit 133*b* reacts to actuation of the control lever 135 in the same manner as the control unit 133*a*.

It should be noted that instead of providing the second shut-off valve 87*b* it would also be conceivable to provide a clutch between the motor 107 and the pump 109, wherein the open position of the clutch would correspond to the closed position of the second shut-off valve 87*b*. The opening of the clutch would bring the pump 109 in idle mode and would prevent that the pump 109 drives the motor 107.

It should further be noted that it would also be possible to operate the actuating arrangement 19 with both shut-off valves 87*a*, 87*b* being open by using the first and second hydraulic subsystems 81*a*, 81*b* at the same time. In this mode of operation both subsystems 81*a*, 81*b* would be active at the same time during normal operation, so that the performance characteristics of the subsystems 81*a*, 81*b* could be reduced. However, it would still be necessary that each of the two subsystems 81*a*, 81*b* is able to operate the linear hydraulic actuator 21, the latching device 41 and the locking device 73 alone.

FIG. 5 schematically shows a second embodiment of the actuating arrangement 19 in more detail. The second embodiment is largely identical to the first embodiment, so that only the differences will be explained. In particular, the first hydraulic subsystem 81*a*, the latching device 41 including the second latching actuator 63*b* and the corresponding switching valve 115, and the locking device 73 including the second locking actuator 77*b* and the corresponding switching valve 117 are identical in arrangement and operation.

Different from the first embodiment, in the second embodiment the second hydraulic subsystem 81*b* does not include the second hydraulic supply 89*b* comprising a second connector assembly 91*b* which is adapted to be connected to a second hydraulic system 93*b* of an aircraft via a mating connector assembly 95*b*. Rather, the switching valve 113 associated with the linear hydraulic actuator 21 is arranged with respect to the second shut-off valve 87*b* in the same manner as the switching valve 97 with respect to the first shut-off valve 87*a*, the hydraulic motor 107 is replaced by an electric motor 137 powered and controlled by a motor control unit 139, which is adapted to be connected and, in turn, controlled by the second control unit 133*b*, and the pump 109 is replaced by a unidirectional variable displacement pump 141. Further, instead of the second hydraulic supply 89*b* and the arrangement of valves 121, 123 and 125 a local power pack or unit 143 is provided, which may be arranged inside the wing arrangement 3 and includes the electric motor 137 and the pump 141 and serves as source of pressurized hydraulic fluid when the second hydraulic subsystem 81*b* is active.

The local power unit 143 comprises a loop portion in which the pressure side of the pump 141 is connected via a check valve 151 and a subsequent pressure relief valve 153 to the suction side of the pump 141. Between the check valve 151 and the pressure relief valve 153 an output line 155 of the local power unit 143 branches off the loop portion, which output line 155 is connected to the supply separation valve 105 in the same manner as the second connector assembly 91*b* is connected to the supply separation valve 105 in the embodiment shown in FIG. 4. The pressure relief valve 153 is normally closed and is adapted to open when a predetermined hydraulic pressure at the pressure side of the pump 141 is exceeded. Therefore, when the supply separation valve 105 is closed and the motor 137 is operated, hydraulic fluid is pumped in the loop portion.

The local power unit 143 further comprises a hydraulic reservoir 145, which is adapted to store hydraulic fluid and may be a hydraulic accumulator. The hydraulic reservoir 145 is connected via a reservoir separation valve 147 to the loop portion between the pressure relief valve 153 and the suction side of the pump 141. The reservoir separation valve 147 is normally closed and is controlled to open when the local power unit 143 is active, i.e. the pump 141 is driven by the motor 137, to thereby connect the suction side of the pump 141 to the hydraulic reservoir 145. The hydraulic reservoir 145 is then operable to serve as a source of pressurized hydraulic fluid in case the hydraulic pressure at the suction side of the pump 141 is lower than the hydraulic pressure in the hydraulic reservoir 145, and to receive pressurized hydraulic fluid from the suction side of the pump 141 in case the hydraulic pressure at the suction side of the pump 141 is higher than the hydraulic pressure in the hydraulic reservoir 145. In this manner, a minimum hydraulic pressure at the output side of the pump 141 can be guaranteed and pressure fluctuations at the suction side can be avoided. By means of the electric motor 137 and the variable displacement pump 141 a constant hydraulic pressure can be provided by the local power unit 143, so that also the second latching actuator 63*b* and the second locking actuator 77*b* can be supplied with pressurized hydraulic fluid by the local power unit 143. Thus, the local power unit 143 is connected to the supply separation valve 105 in the same manner as the first hydraulic supply 89*a* is connected to the supply separation valve 95. Thus, essentially, the second hydraulic subsystem 81*b* of the second embodiment corresponds to the first hydraulic subsystem 81*a* of the second embodiment with the first hydraulic supply 89*a* being replaced by the local power unit 143.

In the second embodiment it is possible that the hydraulic reservoir 145 is connected to the first hydraulic supply 89*a* via a check valve 157, such that hydraulic fluid is provided to the hydraulic reservoir 145 by the first hydraulic system 89*a* if the hydraulic pressure provided by the first hydraulic system 89*a* is higher than the pressure inside the hydraulic reservoir 145. In this manner, the hydraulic reservoir 145 may be suitably and sufficiently filled with pressurized hydraulic fluid during normal operation of the actuating arrangement 19, while at least the first hydraulic subsystem 81*a* is active.

A wing arrangement for an aircraft (1) is disclosed herein which comprises a wing (9) having a base section (11) and a tip section (13) pivotably connected to the base section (11) such that the tip section (13) is pivotable between a deployed position and a stowed position in which the spanwise length of the wing (9) is smaller than in the deployed position. The wing arrangement also has an actuating arrangement (19) including a linear hydraulic actuator (21) coupled between the base section (11) and the tip section (13) such that it is operable to selectively move the tip section (13) between the deployed position and the stowed position, a first and a second hydraulic connection portion (79a, 79b) connected to the linear hydraulic actuator (21) such that they are in fluid communication with different chamber sections (27a, 27b) of a cylinder (25) of the linear hydraulic actuator (21), and a first hydraulic subsystem (81a) and a second hydraulic subsystem (81b), each connected to and branching off the first and second hydraulic connection portions (79a, 79b), and each operable to supply pressurized hydraulic fluid to the first and second hydraulic connection portions (79a, 79b). A first shut-off valve (87a) is located between the first hydraulic subsystem (81a) and the first and second hydraulic connection portions (79a, 79b). The first hydraulic subsystem (81a) comprises a first hydraulic supply (89a) including a first connector assembly (91a) adapted to be connected to a first hydraulic system of an aircraft (1), and the second hydraulic subsystem (81b) comprises a motor (107, 137) and a pump (109, 141), wherein the motor (107, 137) is operable to drive the pump (109, 141) to pump hydraulic fluid contained in the second hydraulic subsystem (81b) to the first and second hydraulic connection portions (79a, 79b).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing arrangement for an aircraft comprising:
   a wing having:
   a base section having a first end portion and an opposite second end portion, wherein the first end portion is adapted to be secured to a fuselage of the aircraft, and
   a tip section having a third end portion and an opposite fourth end portion, wherein the third end portion is pivotably connected to the second end portion such that the tip section is pivotable about a pivot axis between a deployed position and a stowed position in which the spanwise length of the wing is smaller than in the deployed position, and
   an actuating arrangement including:
   a linear hydraulic actuator, which comprises a cylinder defining a cylinder chamber and a piston movably arranged in the cylinder chamber and sealingly dividing the cylinder chamber into a first chamber section and a second chamber section, wherein the linear hydraulic actuator is coupled between the base section and the tip section such that the linear hydraulic actuator is operable to selectively move the tip section between the deployed position and the stowed position,
   a first hydraulic connection portion connected to the linear hydraulic actuator such that the first hydraulic connection portion is in fluid communication with the first chamber section,
   a second hydraulic connection portion connected to the linear hydraulic actuator such that the second hydraulic connection portion is in fluid communication with the second chamber section, and
   a first hydraulic subsystem and a second hydraulic subsystem, each connected to and branching off the first and second hydraulic connection portions, and each operable to supply pressurized hydraulic fluid to the first and second hydraulic connection portions, wherein
   a first shut-off valve is located between the first hydraulic subsystem and the first and second hydraulic connection portions, and is operable to selectively separate the first hydraulic subsystem from the first and second hydraulic connection portions,
   the first hydraulic subsystem comprises a first hydraulic supply including a first connector assembly adapted to be connected to a first hydraulic system of an aircraft which first hydraulic system is operable to supply a plurality of consumers of the aircraft with pressurized hydraulic fluid, and
   the second hydraulic subsystem comprises a motor and a pump, wherein the motor is coupled via a motor shaft to the pump such that motor is operable to drive the pump to pump hydraulic fluid contained in the second hydraulic subsystem to the first and second hydraulic connection portions.

2. The wing arrangement according to claim 1, wherein the linear hydraulic actuator is the only linear hydraulic actuator coupled between the base section and the tip section and operable to move the tip section between the deployed and stowed positions.

3. The wing arrangement according to claim 1, wherein the pivot axis is oriented in a direction extending between a first edge and a second edge of the wing opposite to each other in a chord direction of the wing.

4. The wing arrangement according to claim 1, wherein each of the first and second hydraulic subsystems is adapted to effect movement of the tip section between the deployed and stowed positions independent of the other one of the first and second subsystems.

5. The wing arrangement of claim 1, wherein
   a second shut-off valve is located between the second hydraulic subsystem and the first and second hydraulic connection portions, and is operable to selectively separate the second hydraulic subsystem from the first and second hydraulic connection portions, or
   a clutch is provided between the motor shaft and the pump.

6. The wing arrangement of claim 1, wherein
   the pump and the motor are bidirectional such that the hydraulic fluid contained in the second hydraulic subsystem is pumped to the first hydraulic connection portion or to the second hydraulic connection portion depending on the direction in which the pump is driven by the motor, or
   the pump and the motor are unidirectional and the second hydraulic subsystem further includes a selection valve which can be selectively switched between a first position in which the hydraulic fluid contained in the second hydraulic subsystem is pumped to first hydraulic connection portion and a second position in which the hydraulic fluid contained in the second hydraulic subsystem is pumped to second hydraulic connection portion.

7. The wing arrangement according to claim 1, wherein the motor is an electric motor.

8. The wing arrangement according to claim 7, wherein the second hydraulic subsystem comprises a hydraulic accumulator and a separation valve connected between the hydraulic accumulator and the suction side of the pump, wherein the separation valve is controllable to open when the second hydraulic subsystem is active to thereby connect the suction side of the pump to the hydraulic accumulator, wherein the hydraulic accumulator is connected to the first hydraulic supply via a check valve, such that hydraulic fluid is provided to the hydraulic accumulator by the first hydraulic supply if the hydraulic pressure provided by the first hydraulic supply is higher than the pressure inside the hydraulic accumulator.

9. The wing arrangement according to claim 1, wherein
the second hydraulic subsystem comprises a second hydraulic supply including a second connector assembly separate from the first connector assembly and adapted to be connected to a second hydraulic system of an aircraft which second hydraulic system is operable to supply a plurality of consumers of the aircraft with pressurized hydraulic fluid, and
the motor is a hydraulic motor connected to the second hydraulic supply and operable to be driven by pressurized hydraulic fluid supplied by the second hydraulic supply.

10. The wing arrangement of claim 9, wherein the second hydraulic subsystem comprises a hydraulic accumulator and a pressure relief valve connectable between the hydraulic accumulator and the suction side of the hydraulic pump, wherein the pressure relief valve is normally closed and adapted to open when a predetermined hydraulic pressure is exceeded to thereby connect the suction side of the pump to the hydraulic accumulator.

11. The wing arrangement of claim 10, wherein the hydraulic accumulator is connected via separate check valves to the first and second hydraulic connection portions, so that the hydraulic accumulator is operable to serve as a source of pressurized hydraulic fluid in case the hydraulic pressure at the suction side of the hydraulic pump is lower than the hydraulic pressure in the hydraulic accumulator.

12. The wing arrangement according to claim 1, further comprising
a latching device having at least one latching element which is selectively movable between a latching position and a release position, wherein
when the tip section is in the deployed position and the at least one latching element is moved from the release position to the latching position the at least one latching element engages one of the tip section and the base section and thereby prevents the tip section from moving out of the deployed position, and
when the tip section is in the deployed position and the at least one latching element is moved from the latching position to the release position the tip section or the base section is able to disengage from the at least one latching element, so that the tip section is able to move from the deployed position into the stowed position,
at least one first hydraulic latching actuator and at least one second hydraulic latching actuator, each operable to move the at least one latching element from the latching position into the release position independent of the other one of the at least one first and at least one second hydraulic latching actuator, and
wherein the at least one first hydraulic latching actuator is connected to and operable by the first hydraulic subsystem and the at least one second hydraulic latching actuator is connected to and operable by the second hydraulic subsystem.

13. The wing arrangement according to claim 12, wherein
the at least one first hydraulic latching actuator and the at least one second hydraulic latching actuator are further each operable to move the at least one latching element from the release position into the latching position independent of the other one of the at least one first and at least one second hydraulic latching actuator, or
the latching device includes at least one biasing device which is arranged and adapted to bias the at least one latching element into the latching position.

14. The wing arrangement according to claim 12, further comprising
a locking device having at least one locking element which is selectively movable between a locking position and an enabling position, wherein
when the at least one latching element is in the latching position and the at least one locking element is moved from the enabling position to the locking position the at least one locking element engages the at least one latching element and prevents the at least one latching element from moving out of the latching position, and
when the at least one latching element is in the latching position and the at least one locking element is moved from the locking position to the enabling position the at least one latching element is able to move from the latching position into the release position,
at least one first hydraulic locking actuator and at least one second hydraulic locking actuator, each operable to move the at least one locking element between the locking position and the enabling position independent of the other one of the at least one first and at least one second hydraulic locking actuator, and
wherein the at least one first hydraulic locking actuator is connected to and operable by the first hydraulic subsystem and the at least one second hydraulic locking actuator is connected to and operable by the second hydraulic subsystem.

15. An aircraft comprising:
a fuselage;
a wing arrangement according to claim 1, wherein the first end portion of the base section is attached to the fuselage and the base section is arranged between the fuselage and the tip section, and
a first hydraulic system, which first hydraulic system is operable to supply a plurality of consumers of the aircraft with pressurized hydraulic fluid and which is connected to the first connector assembly.

* * * * *